(12) United States Patent
Fukuoka et al.

(10) Patent No.: US 6,421,498 B1
(45) Date of Patent: *Jul. 16, 2002

(54) IMAGE SIGNAL PROCESSING APPARATUS AND METHOD FOR CROSS-FADING MOVING IMAGE SIGNALS

(75) Inventors: Hiroyuki Fukuoka, Hiratsuka; Taizou Hori, Yokohama; Takayuki Kikuchi, Tokyo; Mitsuo Niida, Kawasaki; Akiyoshi Hamanaka, Hachiouji, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,974

(22) Filed: Oct. 20, 1997

Related U.S. Application Data

(63) Continuation of application No. 08/361,045, filed on Dec. 21, 1994, now abandoned.

(30) Foreign Application Priority Data

Dec. 28, 1993 (JP) ............................................. 5-351455

(51) Int. Cl.⁷ .............................. G11B 27/00; H04N 5/93
(52) U.S. Cl. ............................. 386/53; 386/52; 348/595
(58) Field of Search ................................. 386/4, 52, 53, 386/46, 125, 126; 348/584, 586, 594, 595, 598; 358/909.1, 906

(56) References Cited

U.S. PATENT DOCUMENTS

| | | | | | |
|---|---|---|---|---|---|
| 3,617,626 A | * | 11/1971 | Bluth et al. | ...................... | 386/4 |
| 4,568,976 A | * | 2/1986 | Tarmmell | ...................... | 348/516 |
| 4,999,704 A | * | 3/1991 | Ando | ........................... | 358/133 |
| 5,055,920 A | * | 10/1991 | Illetschko et al. | ............ | 348/18 |
| 5,057,932 A | * | 10/1991 | Lang | ........................... | 386/101 |
| 5,146,334 A | * | 9/1992 | Fukatsu et al. | ............. | 348/591 |
| 5,168,363 A | * | 12/1992 | Kojima et al. | .............. | 358/183 |
| 5,287,187 A | * | 2/1994 | Sato et al. | ................... | 348/595 |
| 5,521,978 A | * | 5/1996 | Oguro | ........................... | 380/10 |
| 5,555,193 A | * | 9/1996 | Tsinberg et al. | ............ | 348/558 |
| 5,598,275 A | * | 1/1997 | Nagasawa et al. | .......... | 386/117 |

* cited by examiner

*Primary Examiner*—Wendy R. Garber
*Assistant Examiner*—Aung S. Moe
(74) *Attorney, Agent, or Firm*—Fitzpatrick, Cella, Harper & Scinto

(57) ABSTRACT

Apparatus and method for cross-fading moving image signals include structure and steps for temporarily storing moving image signals in a memory for a predetermined period of time. Moving image signals read out from the memory and newly-input moving image signals are continuously combined for an operation time equal to or greater than the predetermined period of time. Thus, it is possible to obtain combined signals such that the moving image signals overlap each other in a relatively simple arrangement without using a special magnetic head.

31 Claims, 10 Drawing Sheets

IMAGE SIGNAL PROCESSING APPARATUS AND METHOD FOR CROSS-FADING MOVING IMAGE SIGNALS

This application is a continuation of Application Ser. No. 08/361,045, filed Dec. 21, 1994, now abandoned.

BACKGROUND OF THE INVENTION

1. Field of the Invention

The present invention relates to an image signal processing apparatus and, more particularly, to an image signal processing apparatus having the function of combining a plurality of images.

2. Description of the Related Art

An explanation will be given below of a camera-integrated video cassette recorder (camcorder) as an example of an apparatus for handling image signals, particularly, moving image signals.

This type of camcorder has an overlapping (cross fade) function such that when a scene of a reproduced image is changed, the previous scene disappears gradually and at the same time the following scene appears gradually.

However, in the conventional apparatus of this type, the frame just before the recording is stopped is captured as a plurality of still image signals in the memory from among a series of moving image signals which are recorded just before, and the still image signals are combined with the newly input (photographed) moving image signals. Thus, overlapping (cross fade), wipe or other functions are realized, but a smooth overlapping which is characteristic of a moving image is not realized.

Also, a method is conceivable whereby the newly input (photographed) moving image signals are combined with the reproduced moving image signals while the moving image signals which have been recorded are reproduced, and the combined moving image signals are overwritten. In such a case, it is necessary to provide both a recording head and a reproducing head separately, and thus the apparatus is enlarged, which is objectionable.

SUMMARY OF THE INVENTION

In view of the above-described circumstances, it is an object of the present invention to provide an image signal processing apparatus and method capable of combining, by a simple arrangement, moving images which are input at different times.

To achieve the above-described object, according to one aspect of the present invention, there is provided an image signal processing apparatus, comprising: input means for inputting moving image signals; storing means for storing moving image signals input from the input means for a predetermined period of time; and combining means for combining the moving image signals read out from the storing means with the moving image signals which are input from the input means, wherein the combining means is capable of operating continuously for an operation period at least equal to or greater than the predetermined period of time.

According to another aspect of the present invention, a method of processing image signals includes the steps of (i) inputting moving image signals; (ii) temporarily storing the input moving image signals for a predetermined period of time; and (iii) continuously combining the stored moving image signals with newly input moving image signals for an operation period equal to or greater than said predetermined period of time.

The above and further objects, aspects and novel features of the invention will be more fully appreciated from the following detailed description when read in connection with the accompanying drawings. It is to be expressly understood, however, that the drawings are for the purpose of illustration only and are not intended to limit the invention.

DETAILED DESCRIPTION OF THE PREFERRED EMBODIMENTS

Preferred embodiments of the present invention will be explained below in detail with reference to the accompanying drawings.

Figure 1:
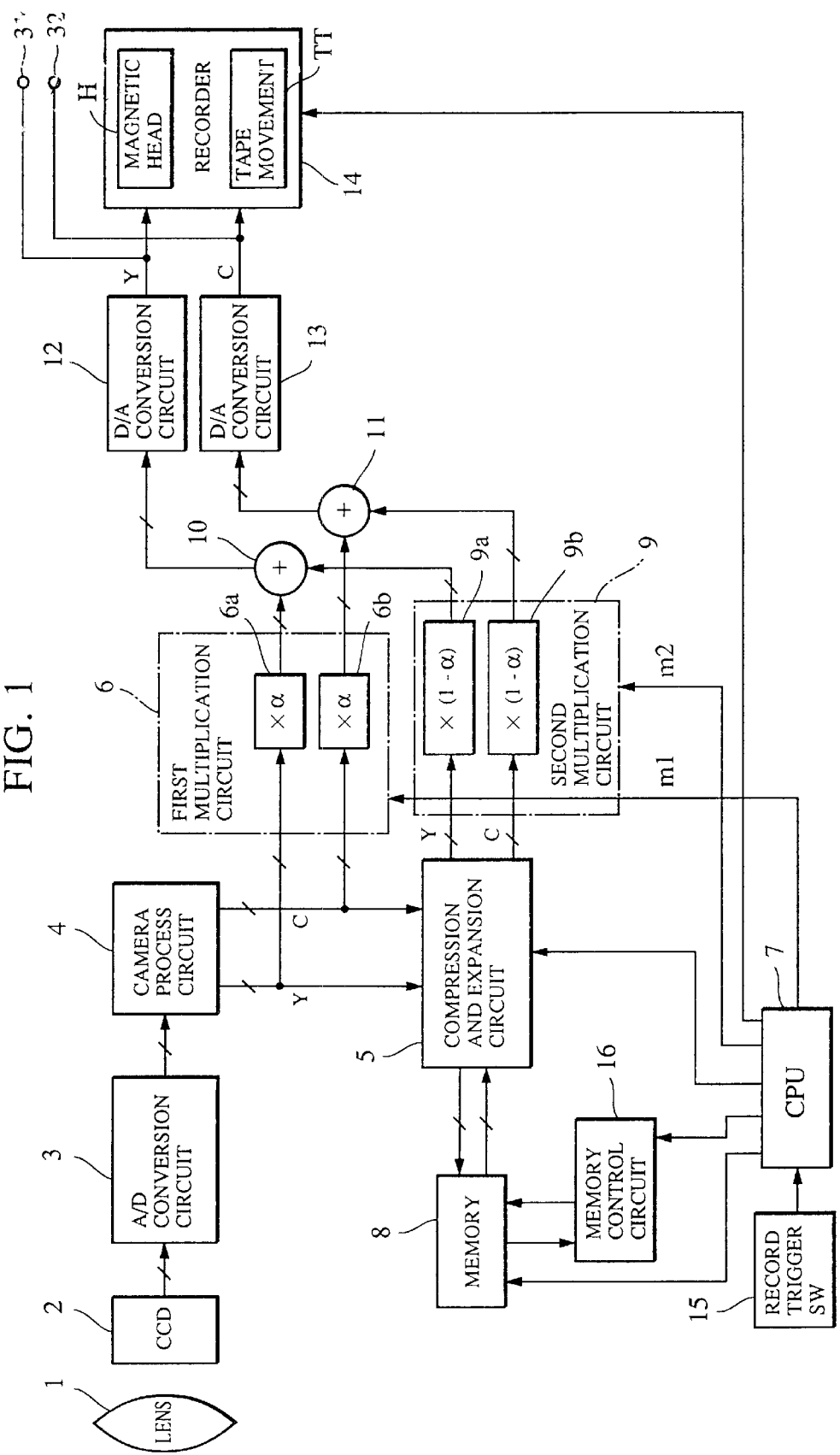
FIG. 1 is a block diagram illustrating the schematic construction of a camcorder in accordance with one embodiment of the present invention.

FIG. 1 is a block diagram illustrating the schematic construction of a recording and reproducing apparatus, such as a camcorder, in accordance with one embodiment of the present invention.

In the recording and reproducing apparatus, a video image formed by a lens 1 is photoelectrically converted by a CCD 2 (which is an imaging element) and formed into moving image signals, converted into digital signals by an analog/digital (A/D) conversion circuit 3, and separated into a luminance signal Y and a color signal C by a camera process circuit 4. The CCD 2 has a γ correction circuit, a knee correction circuit, and the like contained therein.

The luminance signal Y and the color signal C from the camera process circuit 4 are output to a compression and expansion circuit 5 and a first multiplication circuit 6.

The moving image signals which are input to the compression and expansion circuit 5 are compressed therein by a compression circuit 5a (FIG. 2) and stored in a memory 8.

Figure 2:
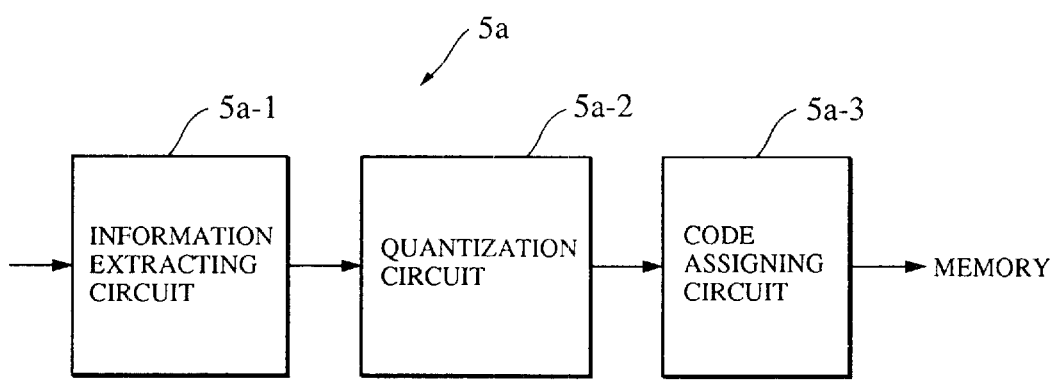
FIG. 2 is a block diagram illustrating the construction of a compression circuit within a compression and expansion circuit of FIG. 1.

FIG. 2 is a block diagram illustrating the schematic construction of the compression circuit 5a. The correlation of the moving image signals input from the camera process circuit 4 is decreased by a known ADCT (Adaptive Discrete Cosine Transform) orthogonal transform method, such as DCT transform or Hadamard transform, by means of an information extracting circuit 5a-1. The signals are quantized by a quantization circuit 5a-2, assigned with binary codes by a code assigning circuit 5a-3, and stored in the memory 8 under the control of a CPU 7.

A memory control circuit 16 (FIG. 1) controls the memory 8 in such a way that the up-to-data image data is always sequentially stored. When the amount of stored data in the memory 8 is counted, and when CPU 7 detects that the amount of stored data has reached a preset amount of data, the oldest data of the stored image data is overwritten with new data in turn by a first-in first-out operation.

In this embodiment, the overlapping time T is set at five seconds, and the amount of stored data which is set initially in the memory control circuit 16 by the CPU 7 is set at an amount of data for three seconds. The memory 8 enters a write mode by the first-in first-out operation when this apparatus is in the normal recording mode or in the E/E mode (the camera is operated, and the recorder section of the VCR is not in the recording mode). In the E/E mode, the luminance signal Y and the color signal C output from D/A converters 12 and 13, which will be described later, are output from output terminals 31 and 32.

The compressed moving image signals stored in the memory 8 are expanded by an expansion circuit 5b (FIG. 3) of the compression and expansion circuit 5, multiplied by a coefficient $(1-\alpha)$ $(0 \leq \alpha \leq 1)$ supplied from the CPU 7 in a second multiplication circuit 9, and output to addition circuits 10 and 11.

Figure 3:
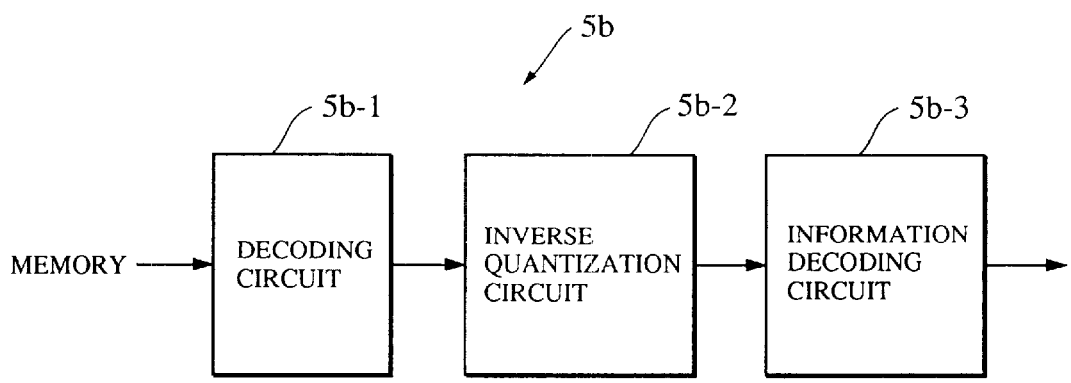
FIG. 3 is a block diagram illustrating the construction of an expansion circuit within the compression and expansion circuit of FIG. 1.

FIG. 3 is a block diagram illustrating the schematic construction of the expansion circuit 5b. The compressed data read out from the memory 8 is decoded by a decoding circuit 5b-1, inverse quantized by an inverse quantization circuit 5b-2, decoded to the original moving image signals by a decoding operation of inverse orthogonal transform, such as IADCT, performed by an information decoding circuit 5b-3, and output to the second multiplication circuit 9.

Regarding the moving image signals input to the first multiplication circuit 6 (FIG. 1), the luminance signal Y is multiplied by a coefficient $[\alpha]$ $(0 \leq \alpha \leq 1)$ (supplied from the CPU 7) in a circuit 6a, and the color signal C is multiplied by a coefficient a $(0 \leq \alpha \leq 1)$ (also supplied from the CPU 7) in a circuit 6b, and output to the addition circuits 10 and 11, respectively.

The luminance signal Y and the color signal C input to the second multiplication circuit 9 are multiplied by a coefficient $(1-\alpha)$ $(0 \leq 1-\alpha \leq 1)$ (supplied from the CPU 7) in a circuit 9a and a circuit 9b, respectively, and output to the addition circuits 10 and 11, respectively. Regarding the moving image signals output from the first multiplication circuit 6 and the second multiplication circuit 9, the luminance signals Y are added by the addition circuit 10, and the color signals C are added by the addition circuit 11. They are then converted into analog signals by the D/A conversion circuits 12 and 13, respectively, and then recorded on a recording medium, such as magnetic tape, by a magnetic head H in a recorder 14.

In the overlapping operation, the values of the coefficient $\alpha$ of the first multiplication circuit 6 and the coefficient $(1-\alpha)$ of the second multiplication circuit 9 are controlled and synchronized by the CPU 7. During the normal recording, the coefficient $\alpha$ is set at "1", and the coefficient $(1-\alpha)$ is set at "0".

Figure 11:
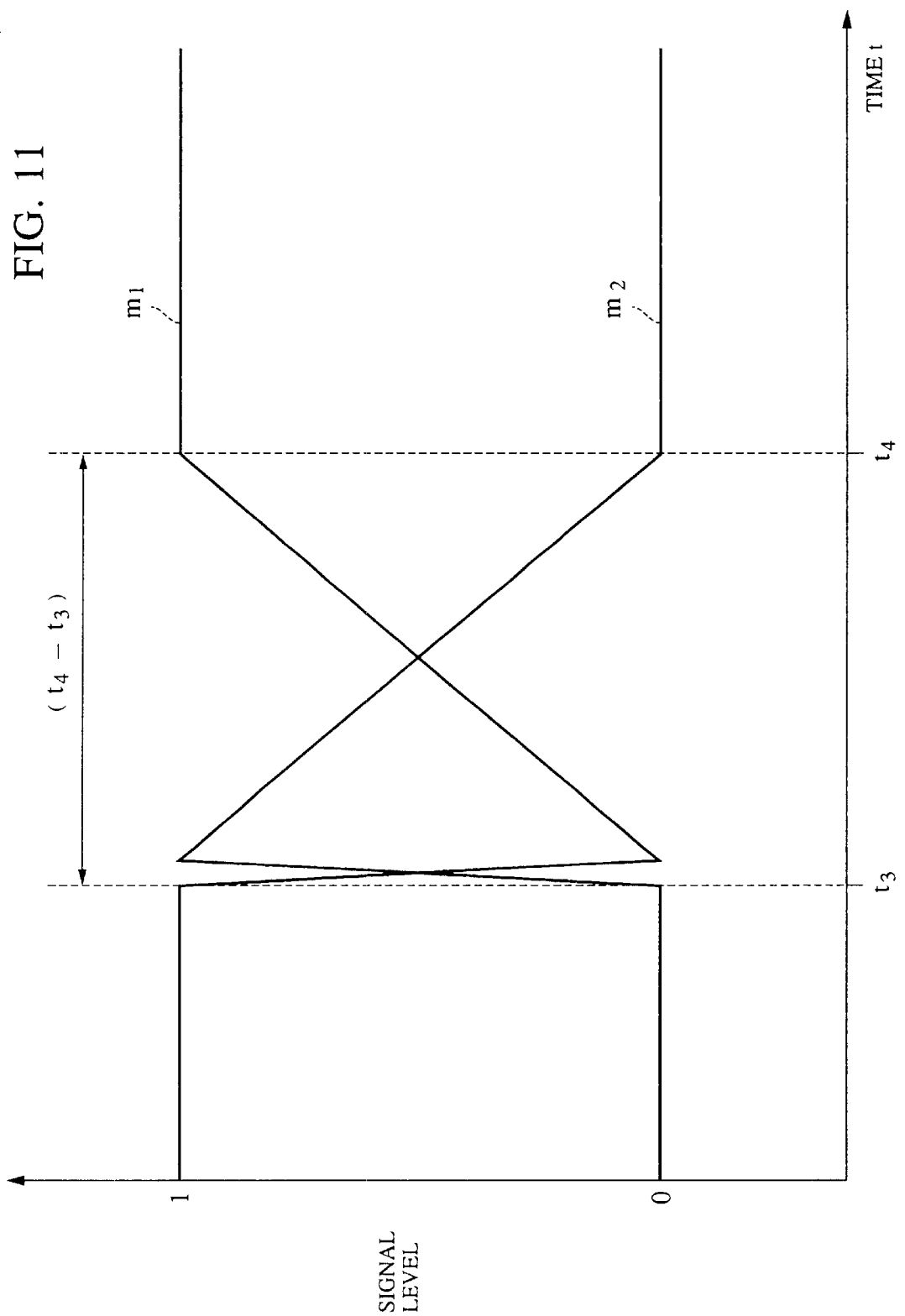
FIG. 11 is a waveform chart illustrating the operation of each embodiment of the present invention.

For a method of increasing the coefficient $\alpha$ and a method of decreasing the coefficient $(1-\alpha)$ in the overlapping operation, any method of increasing the coefficient a and any method of decreasing the coefficient $(1-\alpha)$ relative to the overlapping elapsed time may be used, such as the straight line method depicted in FIG. 11.

Reference numeral 15 (FIG. 1) denotes a record trigger switch for inputting a trigger command. The CPU 7, in response to a trigger command input from the record trigger switch 15, stops the recording operation of the recorder 14, holds the stored contents of the memory 8 at that time, and changes the set value of the memory control circuit 16 to cause the data stored in memory 8 to increase from an amount of data for three seconds to an amount of data for five seconds, corresponding to the overlapping time. Next, the memory 8 stores data for two seconds in addition to the held data in response to the change in the set value of the memory control circuit 16. As a result, compressed data corresponding to the overlapping time is stored as moving image signals in the memory 8. At this time, the recorder 14 causes a tape movement mechanism TT to rewind tape in order to adjust the recording position on the magnetic tape.

At the next trigger command input, the memory 8 starts reading out moving image signals. That is, the moving image signals read out from the memory 8 are expanded by the compression and expansion circuit 5, multiplied by a coefficient $(1-\alpha)$ in the second multiplication circuit 9, added to the moving image signals output from the camera process circuit 4 (which signals are multiplied by a coefficient $\alpha$ in the first multiplication circuit 6) by means of addition circuits 10 and 11, and output as overlapping moving image signals to the recorder 14.

Figure 4A:
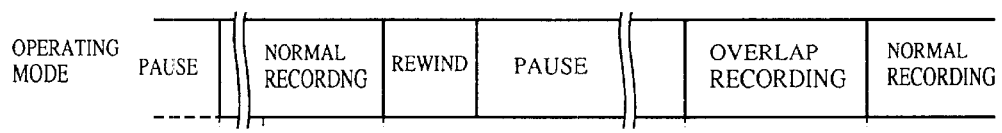
FIGS. 4(a) to 4(f) are diagrams illustrating changes of the operating mode of the camcorder of FIG. 1, and the signals of the timings thereof.
Figure 4B:
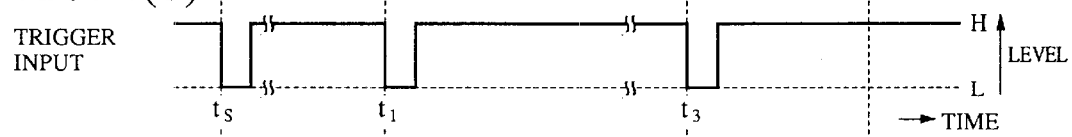
Figure 4C:
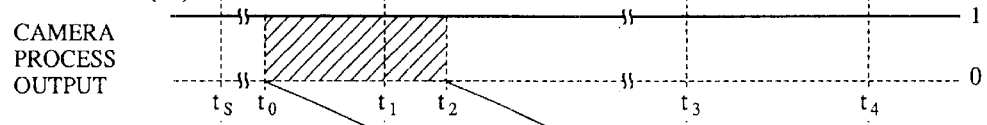
Figure 4D:
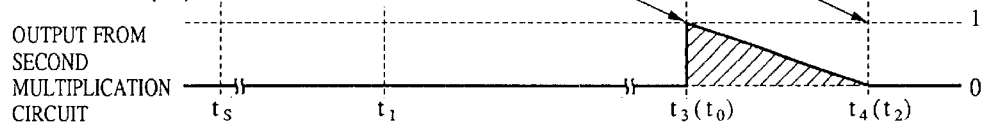
Figure 4E:
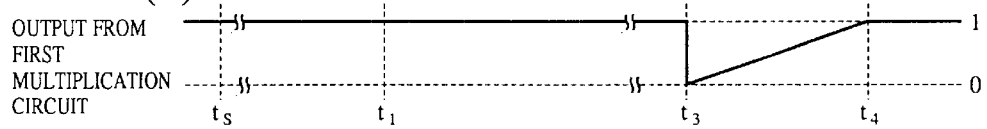
Figure 4F:
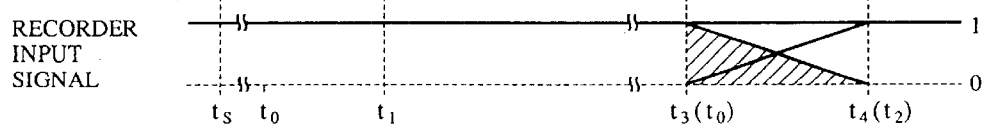

FIGS. 4(a) to 4(f) are timing charts of the operation of the above-described apparatus. FIG. 4(a) is an illustration of the operating mode of this apparatus; FIG. 4(b) is an illustration of a trigger command input from the record trigger switch 15; FIG. 4(c) is an illustration of an output signal level of the camera process circuit 4; FIGS. 4(d) and 4(e) are illustrations of output signal levels of the second multiplication circuit 9 and the first multiplication circuit 6, respectively; and FIG. 4(f) is an illustration of an output signal level from the D/A conversion circuits 12 and 13 to the recorder 14.

During recording by this apparatus, the operating mode is initially in the pause mode as shown in the left end portion of FIG. 4(a).

Next, when a trigger command is received by the record trigger switch 15 at time ts shown in FIG. 4(b), this apparatus enters a normal recording mode, and the recorder 14 starts recording moving image signals. At the same time, the output from the camera process circuit 4 is compressed by the compression and expansion circuit 5 and stored in the memory 8.

In this embodiment, as described above, the overlapping time T is set at five seconds, and the amount of stored data which is set initially in the memory control circuit 16 by the CPU 7 is set at an amount of data for three seconds. The memory 8 is controlled by the memory control circuit 16 in order to always store up-to-date compressed moving image signals for three seconds by the first-in first-out operation.

Next, when a trigger command is issued at time t1 in FIG. 4(b), this apparatus stops the recording operation of the recorder 14 and enters a mode in which the magnetic tape is rewound, and after the magnetic tape is rewound for three seconds, the apparatus enters a pause mode.

On the other hand, the memory 8 stops writing the moving image signals at time t1 and holds the moving image signals serving as compressed data for three seconds from time t0 to t1 shown in FIG. 4(c). At this time, the amount of set data of the memory control circuit 16 for three seconds is changed to image data for five seconds by the CPU 7. The memory 8 writes the moving image signals for two additional seconds from time t1 to t2 to be added to the moving image signals for three seconds which were previously stored. Therefore, the moving image signals for five seconds from time t0 to t2 are stored in the memory 8, and the stored moving image signals are used for overlapping recording from time t3. During the two seconds from t1 to t2, it is necessary that the camera be directed to a desired subject.

The rewinding of the magnetic tape is performed to avoid the following: if the same scene is recorded successively, the reproduced image is very awkward since the moving image signals from t0 to t1 used for overlapping have already been recorded on the magnetic tape.

Figure 5:
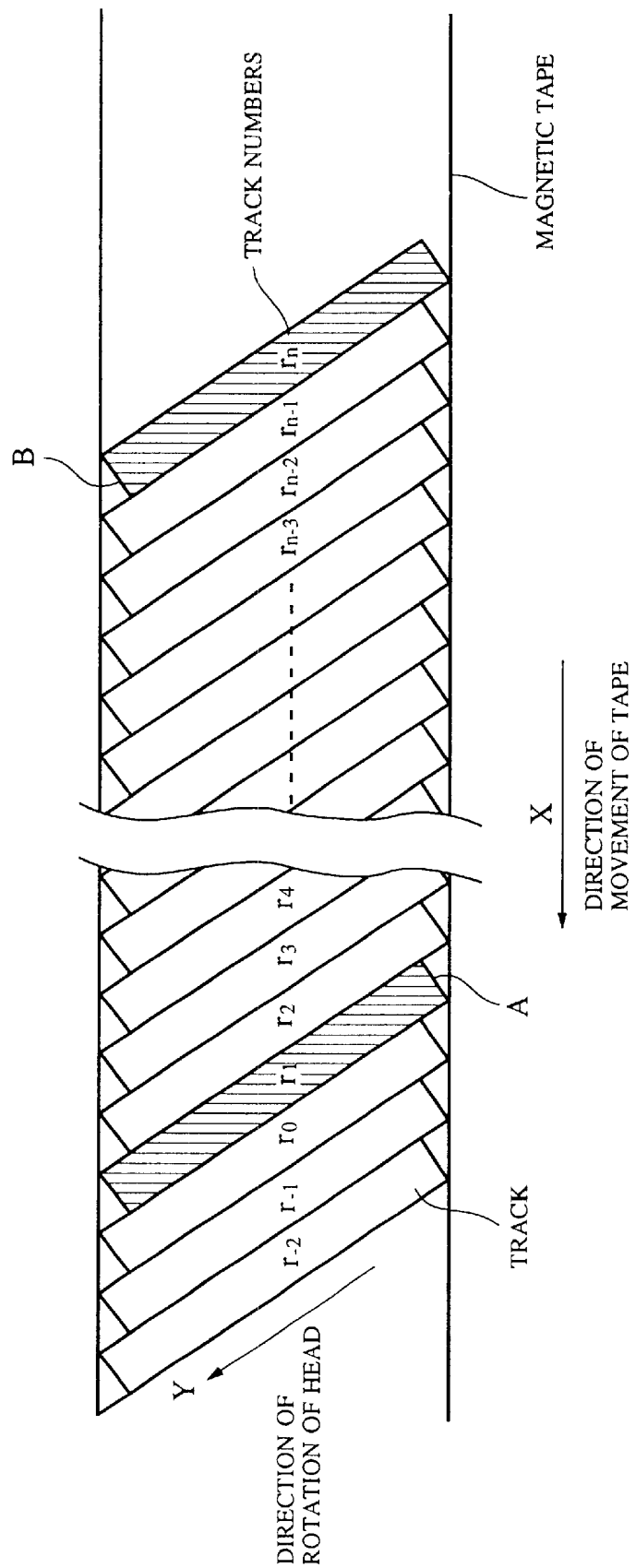
FIG. 5 is an illustration of recording tracks on the tape recorded by the camcorder of FIG. 1.

FIG. 5 is an illustration of the state of recording tracks formed on the magnetic tape by the rotary magnetic head H inside the recorder 14. Each track is successively formed newly in a direction opposite to the movement of the tape indicated by the arrow X in FIG. 5. Signals are newly recorded in the direction of the rotation of the head indicated by the arrow Y in each track.

The position of the magnetic head at time t0 in FIG. 4(a) is set at the record start position A (the lowest portion of a track r1) in FIG. 5. The recorder 14 begins to record the moving image signals onto the magnetic tape from time ts at which the normal recording starts, and moving image signals are recorded on the magnetic tape continuously until the normal recording by the magnetic head terminates at time t1.

When the magnetic head comes to a recording termination position B (the highest portion of the track rn) on the track rn at time t1, the magnetic tape is rewound for three seconds so that the magnetic head is returned to the position A of the track r1. Therefore, when the overlapping recording is started at time t3, the moving image signals recorded from the record start position A of the track r1 to the record termination position B of the track rn are recorded as an image overlapping the video image photographed by the camera from time t3 on the magnetic tape.

Next, when a trigger command is received at time t3 (see FIG. 4), this apparatus enters an overlapping recording mode in which the image data stored in the memory 8 is read out for five seconds by the time t4, expanded by the compression and expansion circuit 5, and added to the moving image signals from the camera process circuit 4 which have been multiplied by the coefficient (1−α) in the second multiplication circuit 9 (as shown in FIG. 4(d)) and multiplied by the coefficient α by the first multiplication circuit 6 (as shown in FIG. 4(e))) by means of the addition circuits 10 and 11. The added signals are then formed into an overlapping video image shown in FIG. 4(f), and converted into analog signals by the D/A converters 12 and 13, after which the signals are recorded by the recorder 14. Control signals m1 and m2 supplied to the first multiplication circuit 6 and the second multiplication circuit 9 before and after times t3 and t4 are as shown in FIG. 11.

When all the image data stored in the memory 8 has been completely read out at time t4 and the overlapping recording is terminated, as shown in FIG. 4(a), the normal recording and writing of image data for three seconds in the recorder 14 is started. That is, at the same time as the moving image signals are begun to be written in the memory 8, the set value of the memory control circuit 16 is reset at the amount of data for three seconds by the CPU 7, and the up-to-date image data for three seconds is always stored and held in the memory 8 by the first-in first-out operation under the control of the memory control circuit 16.

Figure 6:
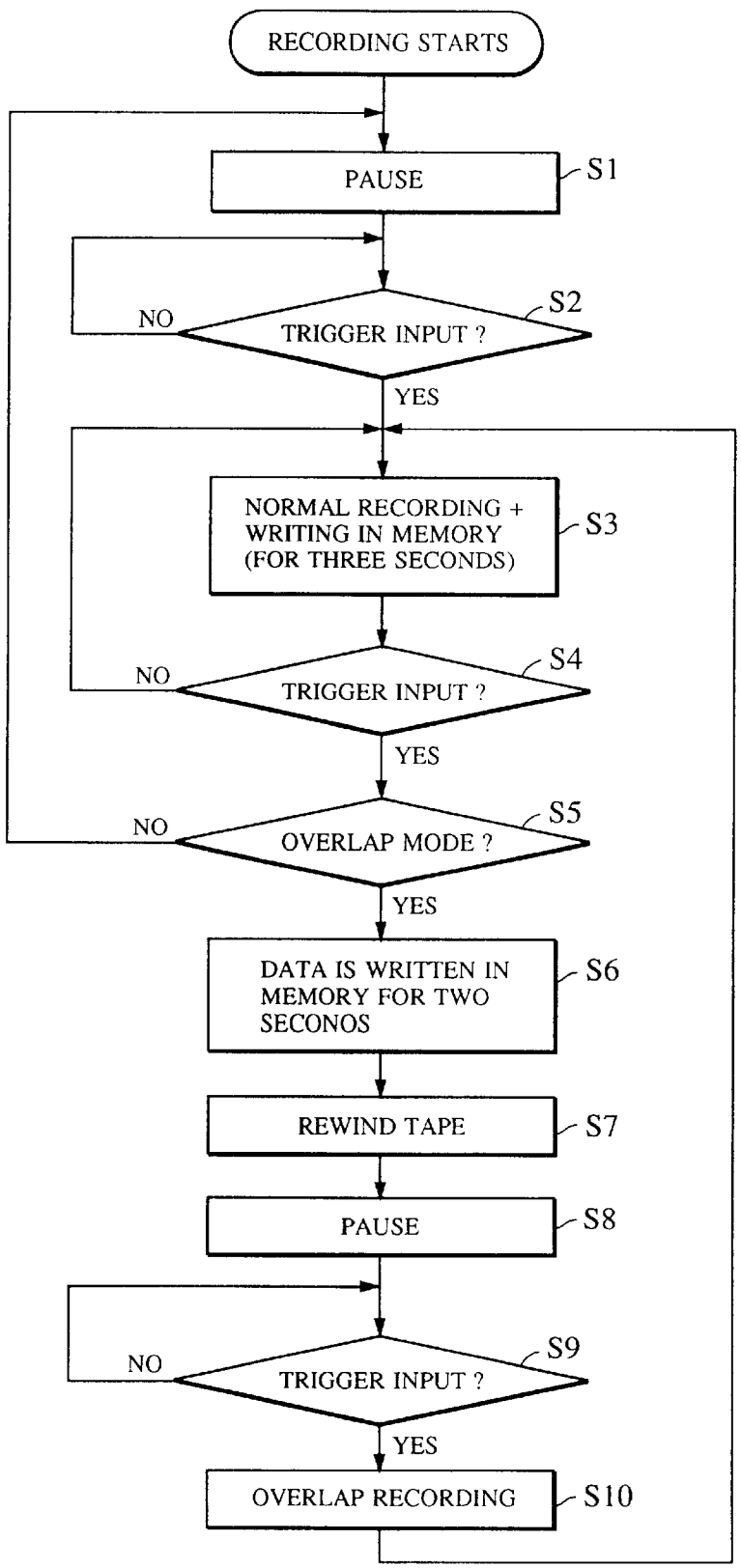
FIG. 6 is a flowchart illustrating the operation of the camcorder of FIG. 1.

FIG. 6 is a flowchart illustrating the flow of the above-described control operation of the CPU 7.

In the figure, during recording, the apparatus is initially placed in the pause mode (step S1). In step S2, a check is made to determine if a trigger input has been received. If there has been a trigger input, the process proceeds to step S3 where the normal recording is started and at the same time the image data is begun to be written in the memory 8. Thus, the up-to-date image data for three seconds is always held during the recording of the previous scene.

Next, a check is made in step S4 to determine if there has been a trigger input. If there has not been a trigger input, the process returns to step S3, and if there has been a trigger input, the process proceeds to step S5 where this apparatus has been set in the overlapping mode. If the apparatus is not in the overlapping mode in step S5, the process returns to step S1, and if the apparatus is in the overlapping mode, the process proceeds to step S6 where additional image data for two seconds is stored in the memory 8 in such a manner as to be added to the image data for three seconds. On the other hand, if there has been a trigger input in step S4, the writing of the image data is stopped at that time, and the tape for three seconds is rewound (step S7), after which the apparatus is placed in the pause state (step S8).

Next, in step S9, a check is made again to determine if there has been a trigger input. If it is determined that a trigger input has been received, the process proceeds to step S10 where the overlapping recording is initiated. When the overlapping recording for five seconds is terminated, the process returns to step S3. During the overlapping recording, the output signals from the first multiplication circuit 6 and the second multiplication circuit 9 vary as indicated by the solid lines m1 and m2 of FIG. 11.

Next, a second embodiment of the present invention will be explained in detail with reference to FIGS. 7 to 9.

Figure 7:
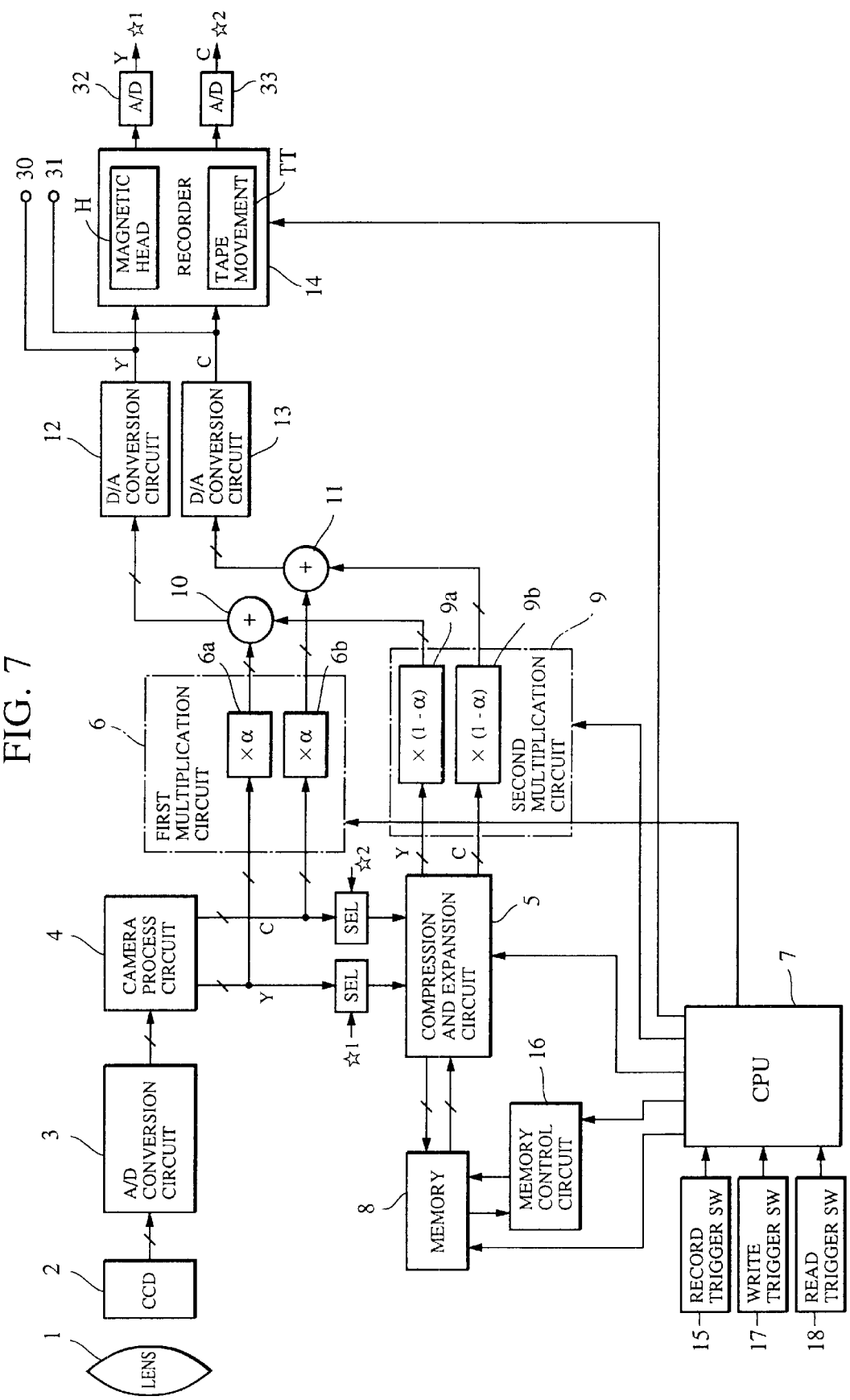
FIG. 7 is a block diagram illustrating the schematic construction of a camcorder in accordance with another embodiment of the present invention.

FIG. 7 is a block diagram illustrating the schematic construction of a recording and reproducing apparatus in accordance with the second embodiment of the present invention. The components in FIG. 7 which are the same as those in FIG. 1 are given the same reference numerals, and an explanation thereof is omitted.

The recording and reproducing apparatus, in addition to the components of the recording and reproducing apparatus of the first embodiment, has a write trigger switch 17 and a read trigger switch 18 provided therein. The write trigger switch 17 instructs the writing of the moving image signals in the memory 8, and the read trigger switch 18 instructs the reading of the moving image signals from the memory 8.

More specifically, when the CPU 7 detects that the write trigger switch 17 is depressed, the memory 8 initiates writing of the moving image signals compressed by the compression and expansion circuit 5 under the control of the memory control circuit 16 regardless of the operating mode of this apparatus from the time the switch 17 is depressed. When the amount of written data reaches the amount of data corresponding to the overlapping time T, then the writing operation is terminated so that the stored contents are held. The moving image signals held in the memory 8 as a result of the write trigger switch 17 being depressed are held until the read trigger switch 18 is depressed.

When the CPU 7 detects that the read trigger switch 18 has been depressed, reading out of the moving image signals stored and held in the memory 8 at that time is initiated regardless of the operating mode of this apparatus. Thus, the moving image signals from the CCD 2 are gradually replaced with the moving image signals read out from the memory 8, and the switched overlapping image is sent out to the recorder 14. That is, when the moving image signals have been stored and held in the memory 8 in accordance with an instruction from the write trigger switch 17, the CPU 7 initiates reading out of the moving image signals from the memory 8 and at the same time sets the coefficient α to be supplied to the first multiplication circuit 6 at "1" and the coefficient (1−α) to be supplied to the second multiplication circuit 9 at "0". Thereafter, the coefficient α is gradually decreased from "1" to "0" and the coefficient (1−α) is gradually increased from "0" to "1" over the overlapping time T, and thus the overlapping image is sent out to the recorder 14.

Therefore, in a case in which the moving image signals have been stored and held in the memory 8 by actuating the write trigger switch 17, upon the read trigger switch 18 being depressed when the operating mode is the normal recording mode or the E/E mode, the reading out of the memory 8 is initiated from when the read trigger switch 18 is depressed, and overlapping image signals which overlap the moving image signals from the CCD 2 are sent out to the recorder 14.

When the memory 8 is in the writing mode, that is, when the contents of the memory 8 are not held by actuation of the write trigger switch 17, the writing in the memory 8 is stopped when the read trigger switch 18 is depressed. The moving image data (compressed data) for the duration from when the read trigger switch 18 was depressed back to the time corresponding to the storage capacity of the memory 8 is stored in the memory 8. At the same time, the reading of the memory 8 is initiated, and overlapping image signals which overlap the moving image signals from the CCD 2 are sent out to the recorder 14. The reproduced luminance signal Y and the reproduced color signal C of the recorder 14 are digitized by A/D converters 32 and 33, respectively. The digitized signals (*1, *2), with the luminance signal Y and the color signal C which are output from the camera process circuit 4, are output from selecting circuits 34 and 35.

Figure 8:
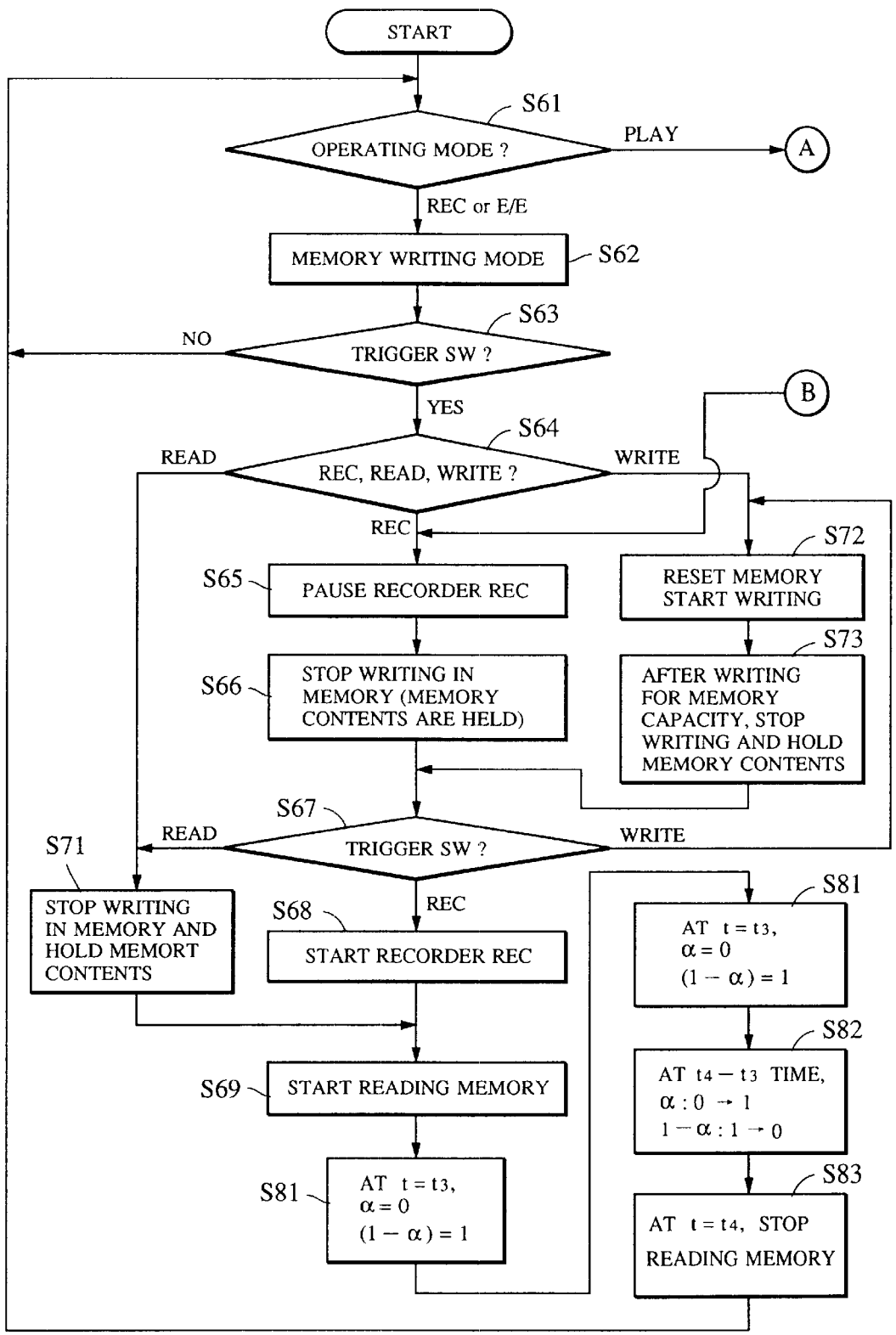
FIGS. 8 and 9 are flowcharts illustrating the operation of the camcorder of FIG. 1.
Figure 9:
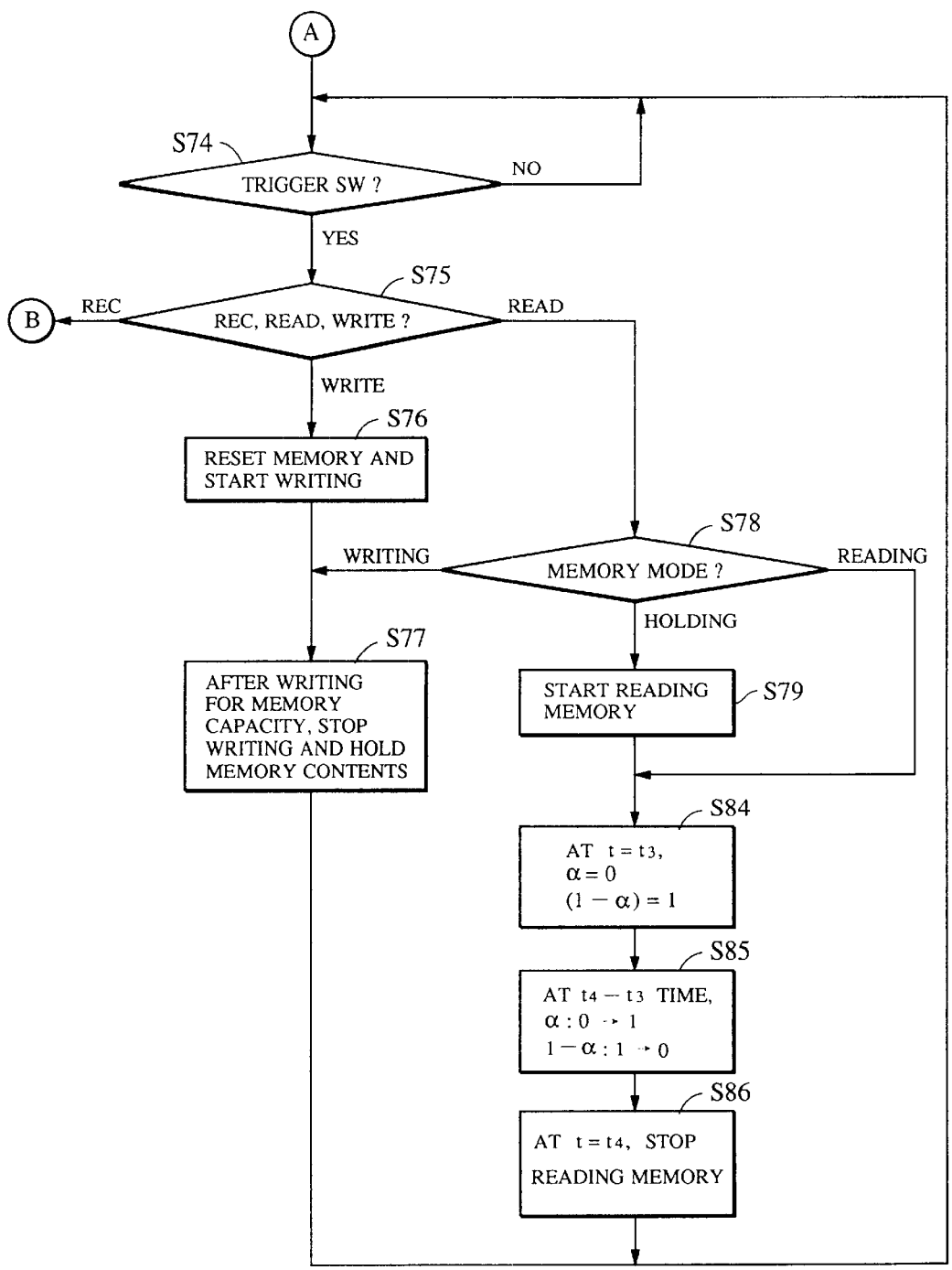

FIGS. 8 and 9 are flowcharts illustrating the control procedure in accordance with the second embodiment of the present invention.

In step S61, a check is made of the operating mode of this apparatus. When the apparatus is in the recording (REC) mode or the E/E mode, the process proceeds to step S62 where the moving image signals are begun to be written in the memory 8 on the basis of the first-in first-out operation.

Next, the process proceeds to step S63 where a check is made to determine if there has been a trigger input. If no trigger input has been received, the process returns to step S61, and if there has been a trigger input, a check is made to determine which trigger switch of the trigger switches 15, 17 and 18 of FIG. 5 has been depressed (step S64).

When the record trigger switch 15 has been depressed, this apparatus enters the pause mode, and the recorder 14 temporarily stops recording (step S65). At the same time, the writing of the compressed data on the basis of the first-in first-out operation in the memory 8 is stopped so that the storage contents at that time are held (step S66), and the process proceeds to step S67.

When the write trigger switch 34 is depressed in step S64, the process proceeds to step S72 where the memory 8 is reset, and the writing of the moving image signals is newly initiated. When the writing of the moving image signals up to the memory capacity corresponding to the overlapping time T is terminated, the writing is stopped, and the memory contents of the memory 8 at that time are held (step S73), and the process proceeds to step S67.

In step S67, a check is made again to determine if the trigger switches 15, 17 and 18 have been depressed. When the write trigger switch 17 has been depressed, the process returns to step S72, and when the read trigger switch 18 has been depressed, the process proceeds to step S71, which will be described later.

On the other hand, when the record trigger switch 15 as been depressed, the recorder 14 initiates the recording operation (step S68), further, the reading out of the moving image signals held in the memory 8 is initiated (step S69), the value of the coefficient α to be supplied to the first multiplication circuit 6 is set at "0" and the value of the coefficient (1−α) to be supplied to the second multiplication circuit 9 is set at "1" (step S81). Next, over the overlapping time T during which the overlapping recording is terminated, the value of the coefficient α is gradually increased to "1", and the value of the coefficient (1−α) is gradually decreased to "0" (step S82). Upon the termination of the overlapping recording, the reading out of the moving image signals from the memory 8 is stopped (step S83).

When the overlapping recording of the moving image signals from the CCD 2 and the moving image signals from the memory 8 is terminated in the above-described way, the process returns to step S61.

When the read trigger switch 18 is depressed in step S64 or S67, the process proceeds to step S71 where the writing of the moving image signals in the memory 8 is stopped, and the memory contents of the memory 8 at that time are held. Then, the reading out of the moving image signals held is initiated (step S69), the above-described operation of step 81 and the subsequent operations are performed, and the process returns to step S61.

If the apparatus is in the reproduction mode in step 61, the moving image signals are read out from the magnetic tape by the recorder 14 of this apparatus. The signals are input to the compression and expansion circuit 5 via the A/D converters 32 and 33, and the selecting circuits 34 and 35. Then, in the next step S74, a check is made to determine if there has been a trigger input. If it is determined in step 75 that the record trigger switch 15 has been depressed, the process returns to step S65.

If it is determined in step S75 that the record trigger switch 15 has been depressed, the process proceeds to step S76 where the reproduced moving image signals are begun to be newly written. When the writing of the moving image signals up to the storage capacity corresponding to the overlapping time is terminated, the writing is terminated, and the storage contents of the memory 8 at that time are held (step S77), and the process returns to step S74. If it is determined in step S75 that the read trigger switch 18 has been depressed, the process proceeds to step S78 where the memory mode is checked.

That is, if the moving image signals have not been stored in the memory 8, the process proceeds to step S77 where the moving image signals for the storage capacity are stored, and the process returns to step S74.

If it is determined in step S78 that the writing and storage of the moving image signals for the storage capacity have already been completed, the reading out of the moving held image signals is initiated in step S79. The value of the coefficient α to be supplied to the first multiplication circuit 6 is set at "0", and the value of the coefficient (1−α) to be supplied to the second multiplication circuit 9 is set at "1" (step S84). Next, over the overlapping time T until all the image data stored in the memory 8 have been completely read out, the value of the coefficient α is gradually increased to "1", and the value of the coefficient (1−α) is gradually decreased to "0" (step S85). Upon the termination of the overlapping time T, the reading out of the moving image signals from the memory 8 is stopped (step S86). If it is determined in step S78 that the reading out of the moving image signals from the memory 8 has already been initiated, the operations from step S84 to step S86 are performed in the same way as described above.

Next, a third embodiment of the present invention will be explained with reference to FIG. 10.

Figure 10:
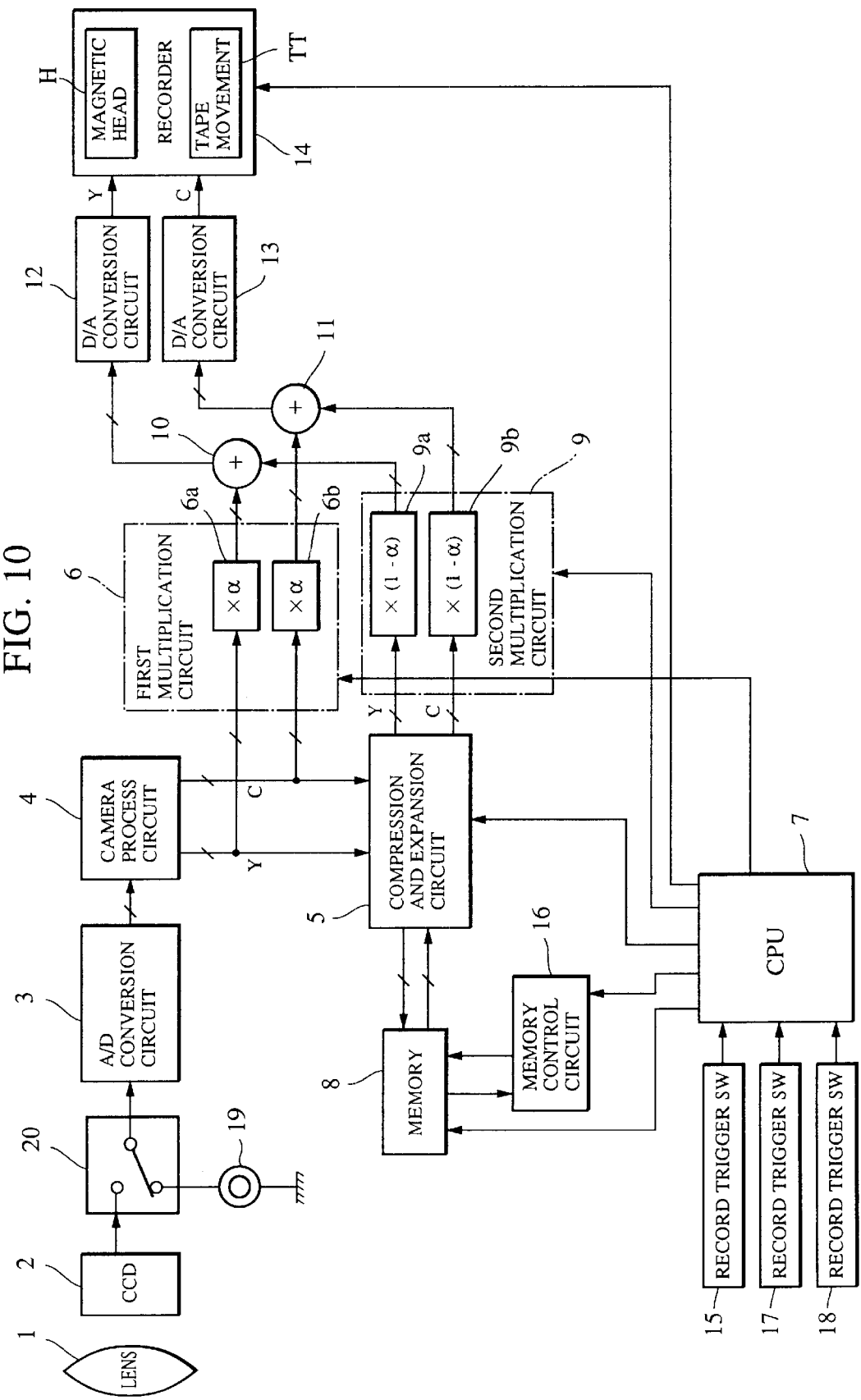
FIG. 10 is a block diagram illustrating the schematic construction of a camcorder in accordance with still another embodiment of the present invention.

FIG. 10 is a block diagram illustrating the schematic construction of a recording and reproducing apparatus in accordance with a third embodiment of the present invention. The components in FIG. 10 which are the same as those in FIG. 1 or 7 are given the same reference numerals, and an explanation thereof is omitted.

This apparatus, in addition to the components of the recording and reproducing apparatus of the first or second embodiment, has an external input terminal 19 and a selecting switch 20 provided therein.

The external input terminal 19 is a terminal for inputting moving image signals from external devices. When the selecting switch 20 has selected the terminal for inputting signals from the external input terminal 19, the moving image signals input from the terminal 19 are output to the A/D converter 3 via the selecting switch 20.

Also, when the selecting switch 20 has selected the terminal for inputting signals from the CCD 2, the moving image signals from the CCD 2 are output to the A/D converter 3 via the selecting switch 20.

Next, a description will be given of the operation of the recording and reproducing apparatus in accordance with the third embodiment of the present invention in a case in which the selecting switch 20 has selected the terminal for inputting signals from the external input terminal 19.

When the CPU 7 detects that the write trigger switch 17 has been depressed, the memory 8 initiates writing the moving image signals which are input from the external input terminal 19 via the selecting switch 20 and which are compressed by the compression and expansion circuit 5 regardless of the operating mode of this apparatus from the time the write trigger switch 17 has been depressed under the control of the memory control circuit 16. When the amount of written data reaches the amount of data corresponding to the overlapping time T, the writing operation terminates at that time, and the storage contents are held. As a result of the write trigger switch 17 being depressed, the moving image signals held in the memory 8 are held until the read trigger switch 18 is depressed.

When the CPU 7 detects that the read trigger switch 18 has been depressed, the moving image signals stored in the memory 8 at that time are begun to be read out regardless of the operating mode of this apparatus. The moving image signals input from the external input terminal 19 via the selecting switch 20 are gradually replaced with the moving image signals read out from the memory 8, and the switched overlapping image is sent out to the recorder 14. That is, when the moving image signals have been stored in the memory 8 in accordance with an instruction from the write trigger switch 17, the CPU 7 initiates reading of the moving image signals from the memory 8, and at the same time sets the coefficient α to be supplied to the first multiplication circuit 6 at "1" and the coefficient (1−α) to be supplied to the second multiplication circuit 9 at "0". Thereafter, the coefficient α is gradually decreased from "1" to "0" and the coefficient (1−α) is gradually increased from "0" to "1" over the overlapping time T, and thus the overlapping image is sent out to the recorder 14.

Therefore, in a case in which the moving image signals have been stored and held in the memory 8 by actuating the write trigger switch 17, upon the read trigger switch 18 being depressed when the operating mode is the normal recording mode or the E/E mode, the reading out of the memory 8 is initiated from when the read trigger switch 18 is depressed, and overlapping image signals which overlap the moving image signals input from the external input terminal 19 via the selecting switch 20 are sent out to the recorder 14.

When the memory 8 is in the writing mode, that is, when the contents of the memory 8 are not held by the write trigger switch 17, the writing in the memory 8 is stopped when the read trigger switch 18 is depressed. The moving image data (compressed data) for the duration from when the read trigger switch 18 was depressed back to the time corresponding to the storage capacity of the memory 8 is stored in the memory 8. At the same time, the reading of the memory 8 is initiated, and overlapping image signals which overlap the moving image signals which are input from the external input terminal 19 via the selecting switch 20 are sent out to the recorder 14.

The operation of this apparatus when the selecting switch 20 has selected the terminal for inputting signals from the CCD 2 is the same as that of the second embodiment.

According to each embodiment of the present invention, as described above, since the moving image data corresponding to at least a part of the overlapping time is always stored in storing means, the time required to direct the camera to a subject after the operating mode shifts from the recording state to the pause state is shortened, and thus ease of operation is improved.

It is possible to store and hold arbitrary moving image data at an arbitrary time in accordance with an instruction from the writing instruction means, and it is possible to initiate the reading out of the moving image data from the storing means at an arbitrary time in accordance with an instruction from the reading instruction means and to perform overlapping recording. Thus, it is possible to increase scene change variations in comparison with the conventional example.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. An image signal processing apparatus, comprising:
   imaging means for receiving an object light and generating moving image signals representing moving images;
   storing means for storing moving image signals generated by said imaging means, the stored moving image signals having movement with respect to each other;
   combining means for receiving the moving image signals which are newly-generated by said imaging means and the moving image signals read out from said storing means, and for combining the moving image signals newly-generated by said imaging means and the moving image signals read out from said storing means, said combining means including coefficient means for multiplying by a coefficient the moving image signals read out from said storing means;

recording means for recording moving image signals, said recording means being capable of recording the moving image signals generated by said imaging means and the moving image signals output from said combining means; and control means for controlling said storing means so as to store the moving image signals generated by said imaging means for a first predetermined time in recording of the moving image signals by said recording means, said control means controlling said storing means according to an instruction for stopping the recording of the moving image signals by said recording means so as to stop writing the moving image signals, generated by said imaging means, into said storing means a second predetermined time after a stop of the recording of the moving image signal by said recording means and to store the moving image signals for the first predetermined time plus the second predetermined time, said control means controlling said storing means and said combining means so that the moving image signals are read out from said storing means for the first predetermined time plus the second predetermined time and that said combining means combines the moving image signals newly-generated by said imaging means and the moving image signals read out from said storing means for the first predetermined time plus the second predetermined time.

2. An apparatus according to claim 1, wherein said combining means causes the moving image signals read out from said storing means to be gradually replaced with the moving image signals generated by said imaging means during an operation period.

3. An apparatus according to claim 1, wherein said combining means comprises:

first and second coefficient means for multiplying the respective coefficients (i) the moving image signals read out from said storing means and (ii) the moving image signals generated by said imaging means; and addition means for adding outputs of said first and second coefficient means.

4. An apparatus according to claim 1, wherein said storing means stores the recorded moving image signals for a predetermined latest period of time while said recording means records the moving image signals input from said input means.

5. An apparatus according to claim 1, wherein said control means initiates the operation of reading from said storing means in response to the initiation of recording by said recording means.

6. An apparatus according to claim 1, wherein said control means controls the operation of said storing means in response to a manual operation regardless of the operation of said recording means.

7. An apparatus according to claim 1, further comprising:

reproducing means for reproducing said moving image signals from said recording medium, wherein the moving image signals reproduced by said reproducing means are supplied to said storing means.

8. An apparatus according to claim 7, wherein the moving image signals reproduced by said reproducing means and the moving image signals generated by said imaging means are selectively supplied to said storing means.

9. An apparatus according to claim 7, wherein said control means controls the operation of said storing means in response to a manual operation regardless of the operation of said recording means.

10. An apparatus according to claim 1, further comprising:

transport means for transporting said recording medium; and wherein said control means for controls the recording medium transport operation of said transport means.

11. An apparatus according to claim 10, wherein said control means causes said recording medium to be transported in a predetermined direction while said recording means is recording, and causes said recording medium to be transported for a predetermined period of time in a direction opposite to said predetermined direction in response to the recording stoppage of said recording means.

12. An apparatus according to claim 11, wherein the predetermined period of time during which said recording medium is transported in a direction opposite to said predetermined direction corresponds to the time of the moving image signals stored in said storing means.

13. An apparatus according to claim 1, further comprising a high-efficiency encoding circuit which encodes the moving image signals generated by said imaging means with a high efficiency encoding method, and forms the moving image signals such that the information quantity is compressed.

14. An apparatus according to claim 13, wherein said high-efficiency encoding circuit performs an orthogonal transform on input video signals.

15. An apparatus according to claim 1, further comprising switching means for selectively outputting one of the moving image signals generated by said imaging means and moving image signals input from an external apparatus.

16. A method of processing image signals, comprising the steps of:

receiving an object light and generating moving image signals representing moving images;

temporarily storing in a storing means the moving image signals generated in said receiving step, the stored moving image signals representing a sequence of moving images; and combining the moving image signals generated in the receiving step and the moving image signals read out from said storing means, said combining step including a multiplying step for multiplying the moving image signals read out from said storing means by a coefficient;

recording moving image signals, said recording step being capable of recording the moving image signals generated in the receiving step and the moving image signals combined in said combining step; and controlling said storing step so as to store the moving image signals generated by the receiving step for a first predetermined time in recording of the moving image signals by the recording step, the controlling step controlling the storing step according to an instruction for stopping the recording of the moving image signals by the recording step so as to stop writing the moving image signals, generated by the receiving step, into said storing means a second predetermined time after a stop of the recording of the moving image signal by the recording step and to store the moving image signals for the first predetermined time plus the second predetermined time, said controlling step controlling said storing step and said combining step so that the moving image signals are read out from said storing means for the first predetermined period plus the second predetermined period and that said combining step combines the moving image signals received in said receiving step and the moving image signals read out from said storing means for the first predetermined period plus the second predetermined period.

17. A method according to claim 16, wherein in said combining step, the stored moving image signals are combined with the generated moving image signals in such a way that the stored moving image signals are gradually replaced with the newly input moving image signals during an operation period.

18. A method according to claim 16, further comprising the step of recording on a recording medium the combined moving image signals.

19. A method according to claim 18, wherein said temporary storing step is performed in linkage with said recording step.

20. A method according to claim 18, wherein said temporary storing step is performed regardless of said recording step.

21. A method according to claim 18, further comprising the step of reproducing from said recording medium the recorded moving image signals.

22. A method according to claim 18, further comprising the step of encoding the input image signals with a high efficiency encoding method which compresses the moving image signal.

23. An imaging apparatus comprising:
- imaging means for receiving light from an object, and for generating moving image signals representing moving images of the object;
- storing means for storing the moving image signals, the stored moving image signals corresponding to a sequence of moving images;
- writing means for writing the moving image signals generated by said imaging means into the storing means;
- combining means for combining moving image signals read out from said storing means and moving image signals newly-generated by said imaging means, said combining means including coefficient means for multiplying the moving image signals read out from the storing means by a coefficient;
- recording means for recording moving image signals, said recording means being capable of recording the moving image signals generated by said imaging means and the moving image signals output from said combining means,
- wherein said writing means writes the moving image signals to be recorded by said recording means into said storing means for a predetermined period of time in recording of the moving image signals, and
- wherein said writing means stops writing the moving image signals, generated by said imaging means, into said storing means in response to a stop of the recording of the moving image signals by the said recording means, a first timing at which said writing means stops writing the moving image signals into said storing means being a second predetermined period of time after a second timing at which said recording means stops recording the moving image signals, the combining means combining the moving image signals read out from said storing means and the moving image signals newly-generated by said imaging means for the predetermined period of time plus the second predetermined period of time.

24. An apparatus according to claim 23, wherein said combining means causes the moving image signals read out from said storing means to be gradually replaced with the moving image signals generated by said imaging means during an operation period.

25. An image signal processing apparatus comprising:
- input means for inputting moving image signals;
- memory means for storing moving image signals input from said input means, the stored moving image signals representing images that move with respect to each other;
- memory control means for controlling a storing operation of said memory means;
- combining means for combining the moving image signals input by said input means and the moving image signals read out from said memory means, said combining means including coefficient means for multiplying by a coefficient the moving image signals read out from said memory means;
- recording means for recording moving image signals, said recording means being capable of recording the moving image signals from said input means and the moving image signals output from said combining means;
- instruction means for providing an instruction for stopping the recording of the moving image signals by the recording means in response to an operation of an operation key; and
- control means for controlling said memory control means so that said memory means stores the moving image signal for a first predetermined period in recording of the moving image signal by said recording means, said control means controlling said memory control means according to the instruction provided by said instruction means so that said memory control means stops writing the moving image signals from said input means into said memory means a second predetermined time after stopping of the recording of the moving image signals and that said memory means stores the moving image signals for the first predetermined period plus the second predetermined period, said control means controlling said memory control means and said combining means so that said memory control means reads out the moving image signals from said memory means for the first predetermined period plus the second predetermined period and that said combining means combines the moving image signals newly-input by said input means and the moving image signals read out from said storing means for the first predetermined period plus the second predetermined period.

26. Apparatus according to claim 25, wherein said input means includes imaging means for imaging an object, and for generating the moving image signals representing the object.

27. Apparatus according to claim 25, further comprising processing means for compressing an information amount of the moving image signals input from said input means, said memory control means writing the moving image signals whose information amount is compressed by said processing means.

28. Apparatus according to claim 27, wherein said processing means expands the information amount of the moving image signals read out from said memory means.

29. Apparatus according to claim 25, further comprising reproducing means for reproducing the moving image signals from the recording medium, said memory control means selectively writing to the recording medium the moving image signals stored in said memory means and the moving image signals input from said input means.

30. Apparatus according to claim 25, wherein said instruction means further provides an instruction for starting of recording of the moving image signals by said recording means.

31. Apparatus according to claim 30, wherein said control means controls said memory control means and said recording means so that said recording means starts said recording operation and that said combining means starts said combining operation according to the instruction for the start of recording provided by said instruction means.

* * * * *

UNITED STATES PATENT AND TRADEMARK OFFICE
CERTIFICATE OF CORRECTION

PATENT NO.     : 6,421,498 B1
DATED          : July 16, 2002
INVENTOR(S)    : Hiroyuki Fukuoka et al.

It is certified that error appears in the above-identified patent and that said Letters Patent is hereby corrected as shown below:

<u>Title page,</u>
Item [56], References Cited, U.S. PATENT DOCUMENTS, insert
-- 5,276,506 A 1/1994 Fujita .... 348/578 --.

<u>Column 3,</u>
Line 7, "up-to-data" should read -- up-to-date --.
Line 43, "a" should read -- α --.

<u>Column 4,</u>
Line 1, "a" should read -- α --.

<u>Column 5,</u>
Line 48, "4(e)))" should read -- 4(e)) --.

<u>Column 8,</u>
Line 7, "as" should read -- has --.

<u>Column 12,</u>
Line 5, "for" should be deleted.

<u>Column 13,</u>
Line 47, "the said" should read -- said --.

Signed and Sealed this

Twenty-fourth Day of December, 2002

JAMES E. ROGAN
*Director of the United States Patent and Trademark Office*